United States Patent [19]

Ishizawa et al.

[11] Patent Number: 4,749,899
[45] Date of Patent: Jun. 7, 1988

[54] MINIATURE ROTARY MACHINERY WITH BRUSHGEAR

[75] Inventors: Eisuke Ishizawa; Takeshi Akiyama, both of Chiba, Japan

[73] Assignee: Mabuchi Motor Co. Ltd., Japan

[21] Appl. No.: 937,016

[22] Filed: Dec. 2, 1986

[30] Foreign Application Priority Data

Dec. 9, 1985 [JP] Japan ............................ 60-189391[U]

[51] Int. Cl.$^4$ ............................................. H02K 13/00
[52] U.S. Cl. ................................ 310/244; 310/40 MM
[58] Field of Search ............... 310/238, 239, 242, 244, 310/40 MM

[56] References Cited

U.S. PATENT DOCUMENTS

| 1,798,394 | 3/1931 | Angus | 310/244 |
| 3,450,916 | 6/1969 | Mabuchi | 310/244 |

FOREIGN PATENT DOCUMENTS

| 44946 | 1/1939 | Fed. Rep. of Germany | 310/244 |
| 1226702 | 10/1966 | Fed. Rep. of Germany | 310/244 |
| 1248501 | 11/1960 | France | 310/244 |

OTHER PUBLICATIONS

RCA Technical Notes, No. 262, Jun. 1959.

Primary Examiner—Mark O. Budd
Attorney, Agent, or Firm—McGlew and Tuttle

[57] ABSTRACT

Miniature rotary machinery with brushgear comprising two arm guides, to which power supply voltage is fed, provided on the inside of a motor case cover; and brush arms having brushes at the tip thereof and brush arm eyes, for rotatably engaging with the arm guides, at the other end thereof, and spring receptacles, made of an insulating material, at the center thereof; both ends of an arc-shaped leaf spring being engaged with the spring receptacles to impart pushing force to the brushes by the resiliency thereof; the brush arm eyes being disposed so as to make contact with the arm guides at a predetermined angle; each of the brush arm eyes having a formed portion whose crosssection includes two mutually intersecting tangent lines making contact with the circular crosssection of the arm guide so that two-point contact is established between the formed portion and the arm guide, when viewed in the crosssectional direction; and if necessary projections or ridges provided on the outer circumferential surface of the arm guides, or on the inner circumferential surface of the brush arms so as to ensure positive electrical contact between the arm guides and the brush arm eyes.

3 Claims, 4 Drawing Sheets

4,749,899

MINIATURE ROTARY MACHINERY WITH BRUSHGEAR

BACKGROUND OF THE INVENTION

1. Field of the Invention

This invention relates generally to miniature rotary machinery with brushgear, and more particularly to miniature rotary machinery with brushgear comprising two sets of brush arms having brushes at one end thereof, and brush arm eyes, for rotatably engaging with arm guides, to which power supply voltage is fed, at the other end thereof so as to ensure stable electrical contact between the brush arm eyes and the arm guides.

2. Description of the Prior Art

The conventional type of brushgear for use in permanentmagnet field type high-power miniature rotary machinery, a miniature motor, for example, usually has such a construction that brushes and a spring are incorporated in a cylindrical brush holder to push the brushes by the resiliency of the spring. The brushgear of this construction, however, has a drawback in that the pushing force of the brushes tends to change with the wear of the brushes, leading to unstable pushing force. Furthermore, the conventional type of brushgear tends to be of a complex construction. Another conventional type of brushgear has such a construction that brushes are installed on brush arms, made of a resilient material, and auxiliary brush arms are provided to reinforce the insufficient pushing force of the brushes in the aforementioned conventional type of brushgear. The brushgear of this construction also has drawbacks in that the pushing force of the brushes tends to be unstable due to the wear of the brushes, the construction is complicated, and the brushes cannot be replaced easily. To solve these problems, the present Applicant previously filed a patent application (Utility Model Application No. 120850/1984) in Japan. In the following, miniature rotary machinery with brushgear as claimed in the previous application will be described, referring to FIGS. 2 through 6.

In FIG. 2 illustrating a perspective view of the miniature rotary machinery according to the previous application and FIG. 3 showing a longitudinal section of the same, a housing 2 and a case cover 3 are fixedly fitted to both ends of a cylindrical motor case 1 with fastening screws 4. Slotted holes (not shown) for the fastening screws 4 are provided on the housing 2 so that the mounting position of the case cover 3 on the motor case 1 can be changed to position brushes at the optimum commutating positions in accordance with the rotating direction of the motor, as will be described later. The slotted holes function as coolling vent holes, together with vent holes (not shown). The central part each of the housing 2 and the case cover 3 pivotally supports a shaft 9 of a rotor 8 by means of bearings 7. A commutator 10 is fixedly fitted to the shaft 9 on the side of the case cover 3. A plurality of vent slots 11 for dissipating the heat generated by the rotor 8, etc. are provided at appropriate intervals on the case cover 3 above the commutator 10. A substantial part on the bottom of the case cover 3 is cut away, except a rim part 3a on which brushgear 12, which will be described later, is installed. On the cut-away part on the bottom of the case cover 3, that is, on the inside surface of the case cover 3, mounted is the brushgear 12. Two magnets 13 are mounted at the central part of the motor case 1. The magnets 13 are indicated at the top and bottom positions in FIG. 3 by turning 90 degrees from the actual mounting positions thereof for the sake of clarity. Needless to say, these magnets 13 do not interfere with the screws 4 in the actually assembled state.

Next, the brushgear 12 will be described in the following. As is apparent from FIGS. 3, 4 (front view), 5 (righthand side elevation), 6 (A) (enlarged sectional view of the brush arm) and 6 (B) (enlarged view of the brush arm in another embodiment), two arm guides 14 are fixedly fitted to the rim part 3a of the case cover 3. The aforementioned case cover 3 is made of an insulating material, such as synthetic resin, and is fixedly fitted via washers 15 to the arm guides 14, made of a metallic material, by staking and other methods. A post supporting base 16a provided at one end of the brush arm 16, which is formed into a columnar shape having a diameter equal to the diameter of the post of the arm guide 14, is engaged with each arm guide 14. A terminal plate 17, which is electrically connected to the end face 16b of the brush arm 16, is also engaged with each arm guide 14. The terminal plate 17 is fixed to each arm guide 14 via a fixing plate 18, made of an insulating material, with a screw 19. To reinforce the brush arm 16, a rib 16c is provided at the post supporting base 16a of the brush arm 16, and a bent piece 16d is formed on the longitudinal side surface of the brush arm 16. As a means to ensure good electrical contact between the arm guide 14 and the brush arm 16, a plurality of ridges 16e, for example, may be formed on the inside surface of the brush arm 16 so as to bring the brush arm 16 in close contact with the outside surface of the arm guide 14, as shown in FIG. 6 (B).

A brush 20 is provided at the tip of the brush arm 16, and a spring receptacle 21, made of an insulating material, is provided at the central part of the brush arm 16. As shown in FIG. 4, each end of a metallic spring 22, which is formed into an arc shape to obtain resiliency, is engaged with each of the spring receptacles 21 provided on the two brush arm 16. When considering the mechanical action of the metallic leaf spring 22 of such a construction, each brush arm 16 is pushed in the lateral direction by the resiliency of the metallic leaf spring 22, and thus pushing force is imparted to the brush 20 by the rotating moment generated around the post supporting base 16a of the brush arm 16 engaged with each arm guide 14. The displacement of the brush arm 16 caused by the metallic leaf spring 22, when the brush 20 is worn out, would be considerably smaller than the displacement of the tip of the brush arm 16 due to the wear of the brush 20. Consequently, the resiliency of the metallic leaf spring 22 even after the wear of the brushes, would be almost equal to the resiliency thereof before the wear of the brush 20, and the aforementioned rotating moment around the post supporting base 16a of the brush arm 16 can be considered virtually the same. This means that the pushing force exerted by the brush on the commutator 10 is kept always constant, independently on the wear of the brush 20.

When considering the electrical performance of the metallic leaf spring 22, the brush arms are doubly insulated at two locations by the spring receptacles 21, made of an insulating material, provided on the brush arms 16. Consequently, should either of the brush arms 16 make electrical contact with the metallic leaf spring 22 by mistake, insulation is maintained by either of the spring receptacles 21, and no shortcircuiting takes place between the two brush arms 16.

When replacing the brushes 20, both ends of the arc-shaped metallic leaf spring 22 are disengaged from the spring receptacles 21. And then, the brush arm 16 can be easily removed by loosening each fastening screw 19 fastening the brush arm 16 and the terminal plate 17, and sliding the brush arm 16 sideways from the arm guide 14 from the left to the right in FIG. 3. Thus, the brush 20 can be easily replaced by replacing the brush 20 on the removed brush arm 16 with a new one, or installing the pre-assembled brush/brush arm unit in the reverse order.

Since the brushgear 12 described above is installed on the side of the lower inside surface of the case cover 3, the brush 20 is rotated together with the case cover 3 as the case 3 is rotated. Therefore, the relative positions of the brushes 20 with respect to the magnet 13 installed on the housing 2 can be adjusted by moving the fixing position of the case cover 3 by shifting the locations of the fastening screws 4 along the slotted holes 5 on the housing 2. Thus, the brushes 20 can be easily moved to the optimum commutating positions in accordance with the rotating direction of the motor.

In the foregoing, the miniature rotary machinery with brushgear which was filled by the present Applicant has been described. To improve electrical connection between the brush arm and the arm guide, the present Applicant filed in Japan another patent application, Utility Model Application No. 176146/19184 (hereinafter referred to as the second application). In the following, the second application will be described, referring to FIG. 7, which is an enlarged sectional view of the portion at which the brush arm is fixedly fitted to the arm guide in miniature rotary machinery using the brushgear of the second application.

Miniature rotary machinery with the brushgear of the second application has essentially the same construction as the first application described earlier with reference to FIGS. 2 through 6, except that a ring-shaped projection 14a is provided on the side surface of the arm guide 14, as shown in FIG. 7.

In miniature rotary machinery having the brushgear embodying the aforementioned first or second applications, the radius of the brush arm eye portion at which the brush arm eye comes in contact with the arm guide is made slightly larger because of the need to make the brush arm rotatable with respect to the arm guide. This inevitably leads to a certain degree of play between the brush arm and the arm guide. The aforementioned first and second applications therefore involve an unwanted problem of the play deteriorating electrical connection between the brush arm and the arm guide.

SUMMARY OF THE INVENTION

This invention is intended to overcome these problems.

It is a first object of this invention to provide miniature rotary machinery with brushgear comprising two arm guides, to which power supply voltage is fed, provided on the inside surface of the motor case cover; brush arms having brushes at the tip thereof, brush arm eyes for rotatably engaging with the arm guides at the other end thereof, and a spring receptacles, made of an insulating material, at the central part thereof; and having such a construction that both ends of an arc-shaped leaf spring are engaged with the spring receptacles to impart pushing force to the brushes by the resiliency of the leaf spring; the brush arm eyes coming in contact with the arm guides at a predetermined angle; the brush arm eyes having formed portions whose crosssection includes two mutually intersecting tangent lines making contact with the circular crosssection of the arm guides to establish two-point contact between the formed portions of the brush arm eyes and the arm guides to ensure electrical contact between the arm guides and the brush arm eyes.

It is a second object of this invention to provide miniature rotary machinery with brushgear in which the brush arm eyes have two surfaces for making contact with the arm guides.

It is a third object of this invention to provide miniature rotary machinery with brushgear in which a ring-shaped projection is provided on the outer circumferential surface of the arm guide to further improve electrical contact between the arm guide and the brush arm eye.

It is a fourth object of this invention to provide miniature rotary mahcinery with brushgear in which ridges are provided on the brush arm eye to further improve electrical contact between the brush arm eye and the arm guide.

DETAILED DESCRIPTION OF THE EMBODIMENT

Figure 1:
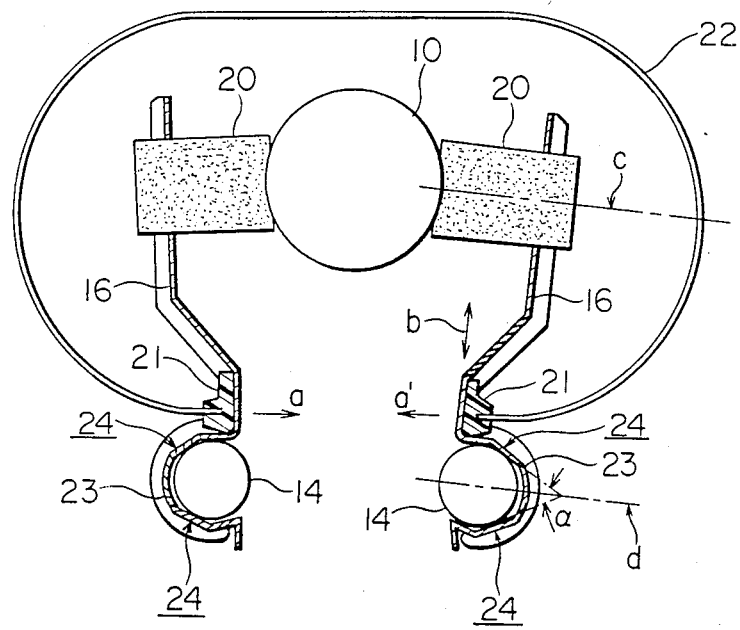
FIG. 1 is a diagram of assistance in explaining an embodiment of brushgear of this invention.
Figure 2:
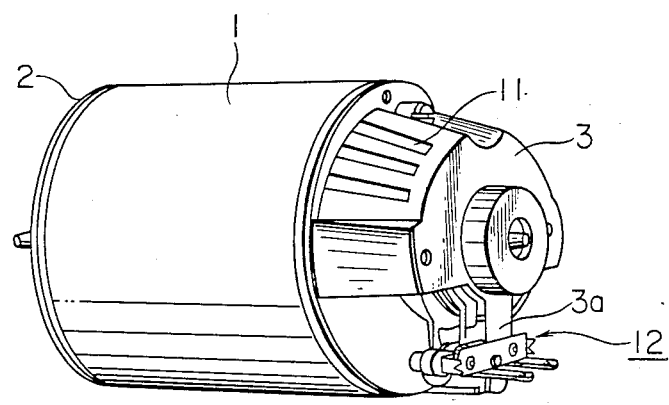
FIG. 2 is a perspective view of miniature rotary machinery on which the present invention is based.
Figure 3:
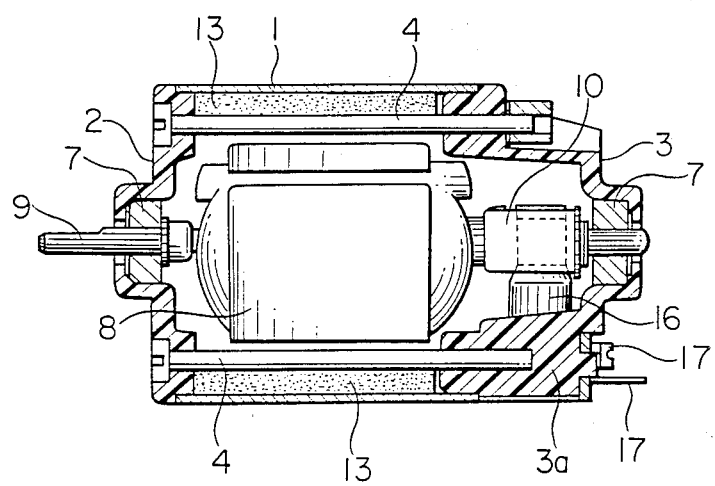
FIG. 3 is a longitudinal section of the miniature rotary machinery shown in FIG. 2.
Figure 4:
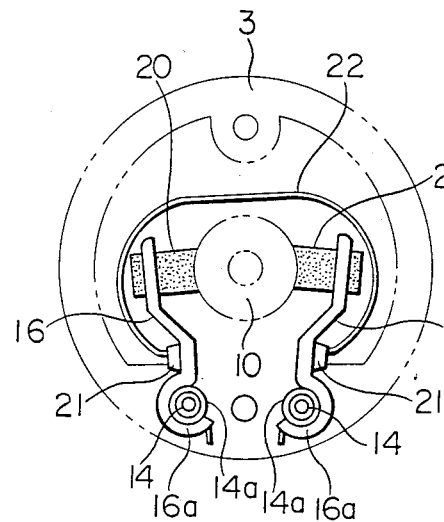
FIG. 4 is a front view of the brushgear used in the miniature rotary machinery shown in FIGS. 2 and 3.
Figure 5:
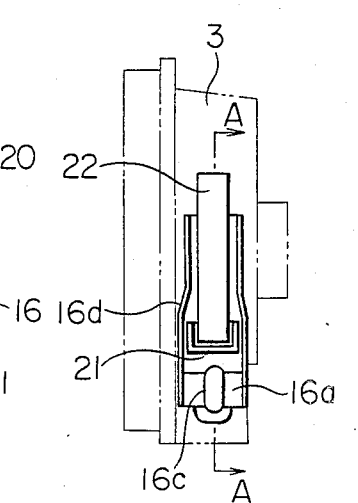
FIG. 5 is a side elevation of the brushgear shown in FIG. 4.
Figure 6A:
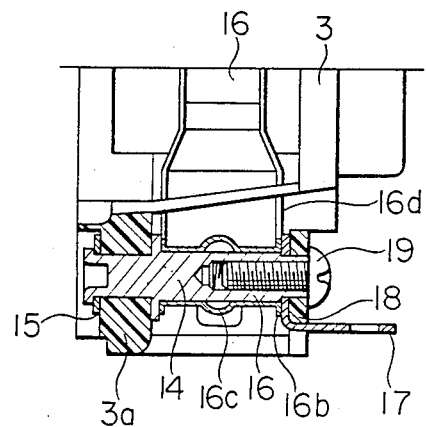
FIGS. 6 (A), (B) and 7 are enlarged sectional views of the part at which the brush arm and the arm guide, as shown in FIGS. 4 and 5, are fixedly fitted to each other.
Figure 6B:
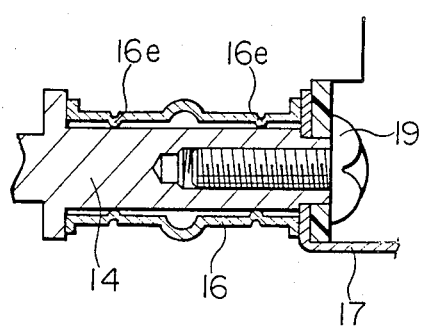

FIG. 1 is a diagram of assistance in explaining an embodiment of brushgear of this invention, representing a sectional view at a position corresponding to line A—A in FIG. 5. In the figures, reference numerals 10, 14, 16, 20, 21 and 22 correspond with like parts shown in FIGS. 2 through 7. Numeral 23 refers to a brush arm eye; and 24 to a contact surface on the brush arm eye 23, respectively.

This invention has essentially the same construction as the examples of miniature rotary machinery with brushgear, on which this invention is based, and which has been described with reference to FIGS. 2 through 7. That is, the brushgear used in miniature rotary machinery according to this invention can be considered similar to the examples shown in FIGS. 6 (A), (B) and 7.

In FIG. 1, the brushgear according to this invention has two contact surfaces 24 disposed at a predetermined angle (shown by arrow a) on the brush arm eye 23 of the brush arm 16. As the brush arm 16 is pushed in the direction shown by arrows a and a' by the leaf spring 22, the brush arm 16 is engaged with the arm guide 14 in the state where the contact surfaces 24 come in contact with the arm guide 14. In this state, the centerline (shown by arrow c) of the brush 20 becomes almost parallel with the centerline (shown by arrow d) of the brush arm eye 23, causing the brush arm 16 to be held in a state the arm guide 14 is supported by the two contact surfaces 24 and 24.

Figure 7:
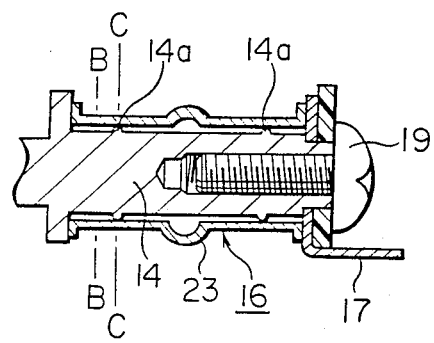
Figures 8A, 8B:
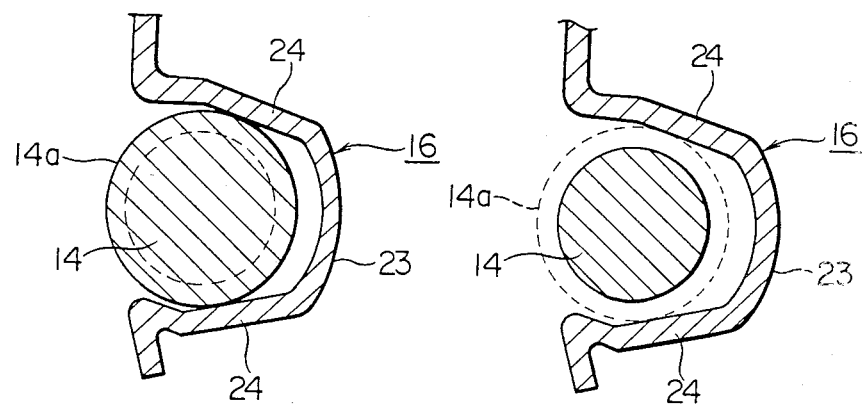
FIGS. 8 (A) and (B) are enlarged sectional views taken along lines C—C and B—B in FIG. 7 in a case where the shape shown in FIG. 7 is adopted.

FIGS. 8 (A) and (B) are enlarged sectional views taken along lines C—C and B—B in FIG. 7. As can be clearly seen in the sectional view, each of the contact surfaces 24 and 24 has a formed portion whose crosssection includes two mutually intersecting tangent lines with respect to the circular crosssection of the arm guide 14. In other words, this invention should have such a construction that twopoint contact as shown in FIG. 8 (A) is established between the arm 14 guide and the contact surfaces 24 and 24.

Consequently, the fine vibration of the brush arm 16 produced in the direction shown by arrow b (see FIG. 1) by the rotation of the commutator 10 can be prevented. To increase the force preventing the fine vibration, the angle $\alpha$ formed by the contact surfaces 24 and 24 should of course be as small as possible. Taking into consideration structural factors, the angle $\alpha$ may preferably be of the order of 30 degrees.

In the foregoing, the embodiment shown in FIG. 1 has been described. This invention, however, need not be limited to the embodiment. The brush arm eye 23 shown in FIG. 1 may be provided on the examples described at the beginning of this invention, referring to FIGS. 6 (A) and (B). Although the embodiment shown in FIG. 1 has planar contact surfaces 24 and 24 on the brush arm 23, the same effect can be obtained by forming the brush arm eye 23 into a ring shape and shifting the centerline of the ring-shaped brush arm eye 23 away from the center of the arm guide 14 to form two-point contact (not shown) with the brush arm eye 23.

As described above, this invention makes it possible to ensure good and stable electrical contact between the brush arms and the arm guides and prevent the fine vibration of the brush arms caused by the rotation of the commutator, whereby stabilizing the power fed to the commutator via the arm guides and the brush arms. Consequently, this invention makes it possible to increase supply current, leading to miniature rotary machinery having stable performance and high efficiency. Capable of preventing the fine vibration of the brushes, this invention helps extend the service life of the commutator and the brushes, contributing much to improved service life of miniature rotary machinery.

What is claimed is:

1. Miniature rotary machinery with brushgear comprising two arm guides, to which power supply voltage is fed, provided on the inside surface of a motor case cover; brush arms having brushes at the tip thereof, brush arm eyes, for rotatably engaging with said arm guides, at the other end thereof, and brush arms having spring receptacles, made of an insulating material, at the central part thereof; and characterized in that both ends of an arc-shaped leaf spring are engaged with said spring receptacles to impart pushing force to said brushes by the resiliency of said leaf spring; said brush arm eyes being adapted to come in contact with said arm guides at a predetermined angular position; said brush arm eyes having formed portions whose crosssection includes two mutually intersecting tangent lines making contact with the circular crosssection of said arm guides so that two-point contact is established crosssectionally between said formed portions and said arm guides to ensure electrical contact between said formed portions and said arm guides.

2. Miniature rotary machinery with brushgear as claimed in claim (1) where a ring-shaped projection is provided on the outer circumferential surface of each of said arm guides to further improve electrical contat between arm guides and brush arm eyes.

3. Miniature rotary machinery with brushgear as claimed in claim (1) wherein a plurality of ridges are provided on each of said brush arm eyes to further improve electrical contact between arm guides and brush arm eyes.

* * * * *